United States Patent
Siplinger

(12) 
(10) Patent No.: US 6,301,868 B1
(45) Date of Patent: Oct. 16, 2001

(54) VORTEX REDUCING MOWER BLADE

(76) Inventor: James D. Siplinger, 2343 E. Langston, Springfield, MO (US) 65804

( * ) Notice: Subject to any disclaimer, the term of this patent is extended or adjusted under 35 U.S.C. 154(b) by 0 days.

(21) Appl. No.: 09/383,710

(22) Filed: Aug. 26, 1999

Related U.S. Application Data

(60) Provisional application No. 60/098,041, filed on Aug. 27, 1999.

(51) Int. Cl.[7] .................................................. A01D 34/63
(52) U.S. Cl. ............................................. 56/295; 56/255
(58) Field of Search ......................... 56/17.5, 255, 295, 56/DIG. 19, DIG. 20; 30/276, 357

(56) References Cited

U.S. PATENT DOCUMENTS

| | | | |
|---|---|---|---|
| 2,737,003 | * 3/1956 | Beers | 56/295 |
| 2,857,729 | * 10/1958 | Zoldok | 56/295 |
| 3,097,468 | * 7/1963 | Johnson | 56/295 |
| 3,097,469 | * 7/1963 | Belfiore | 56/295 |
| 3,183,655 | * 5/1965 | Dunlap et al. | 56/295 |
| 4,046,336 | 9/1977 | Tangler | 244/198 |
| 4,108,403 | 8/1978 | Finch | 244/199 |
| 4,149,358 | * 4/1979 | Comer | 56/295 |
| 4,214,426 | 7/1980 | Lindbald | 56/295 |
| 4,254,607 | 3/1981 | Moore | 56/295 |
| 4,257,214 | * 3/1981 | Ferguson et al. | 56/295 |
| 4,290,258 | * 9/1981 | Gobler | 56/295 |
| 4,426,831 | 1/1984 | Klas et al. | 56/295 |
| 4,451,206 | 5/1984 | Philippe et al. | 416/228 |
| 4,595,160 | 6/1986 | Santos | 244/199 |
| 4,628,672 | * 12/1986 | Jones | 56/295 |
| 4,930,981 | 6/1990 | Walker | 415/119 |
| 5,033,259 | * 7/1991 | Adcock | 56/295 |
| 5,181,830 | * 1/1993 | Chou | 416/223 R |
| 5,190,441 | 3/1993 | Murphy et al. | 416/129 |
| 5,209,052 | * 5/1993 | Carroll | 56/255 |
| 5,331,795 | 7/1994 | Doi | 56/255 |
| 5,492,289 | 2/1996 | Nosenchuck et al. | 244/204 |
| 5,839,263 | * 11/1998 | Biernath et al. | 56/255 |
| 5,992,793 | * 11/1999 | Perry et al. | 244/17.11 |

* cited by examiner

*Primary Examiner*—Thomas B. Will
*Assistant Examiner*—Nathan Mammen
(74) *Attorney, Agent, or Firm*—Jonathan A. Bay

(57) ABSTRACT

A vortex reducing mower blade for use with a rotary lawn mower having a motor and a depending drive shaft has a cutting edge on each leading edge thereof, an airlift on each trailing edge thereof, and outboard ends extending between the terminations of the leading and trailing edges. The outboard ends generally meet with the trailing edges at respective trailing corner- or tip-regions. Each outboard end has margins formed as a boundary-layer fence that is angled either upwardly or downwardly relative to a given relative up direction which is parallel to the central axis of the depending drive shaft. These boundary-layer fences reduce the production and/or strength of vortices in the wake of the trailing corner- or tip-regions of the blade. Each boundary-layer fence may be angled either upwardly or downwardly at generally a right angle. To produce a blade this way, generally the blade might be produced from flat steel stock including that each boundary-layer fence is formed as separate weldment from comparable flat steel stock for attaching in position by means of welding. Alternatively, each boundary-layer fence may be angled either upwardly or downwardly in generally a curving sweep. Producing a blade this way can be accomplished by producing the blade as a unit from a single stock piece of flat steel including that the boundary-layer fences are configured therein by means of a brake, stamping or press-forming operation.

20 Claims, 3 Drawing Sheets

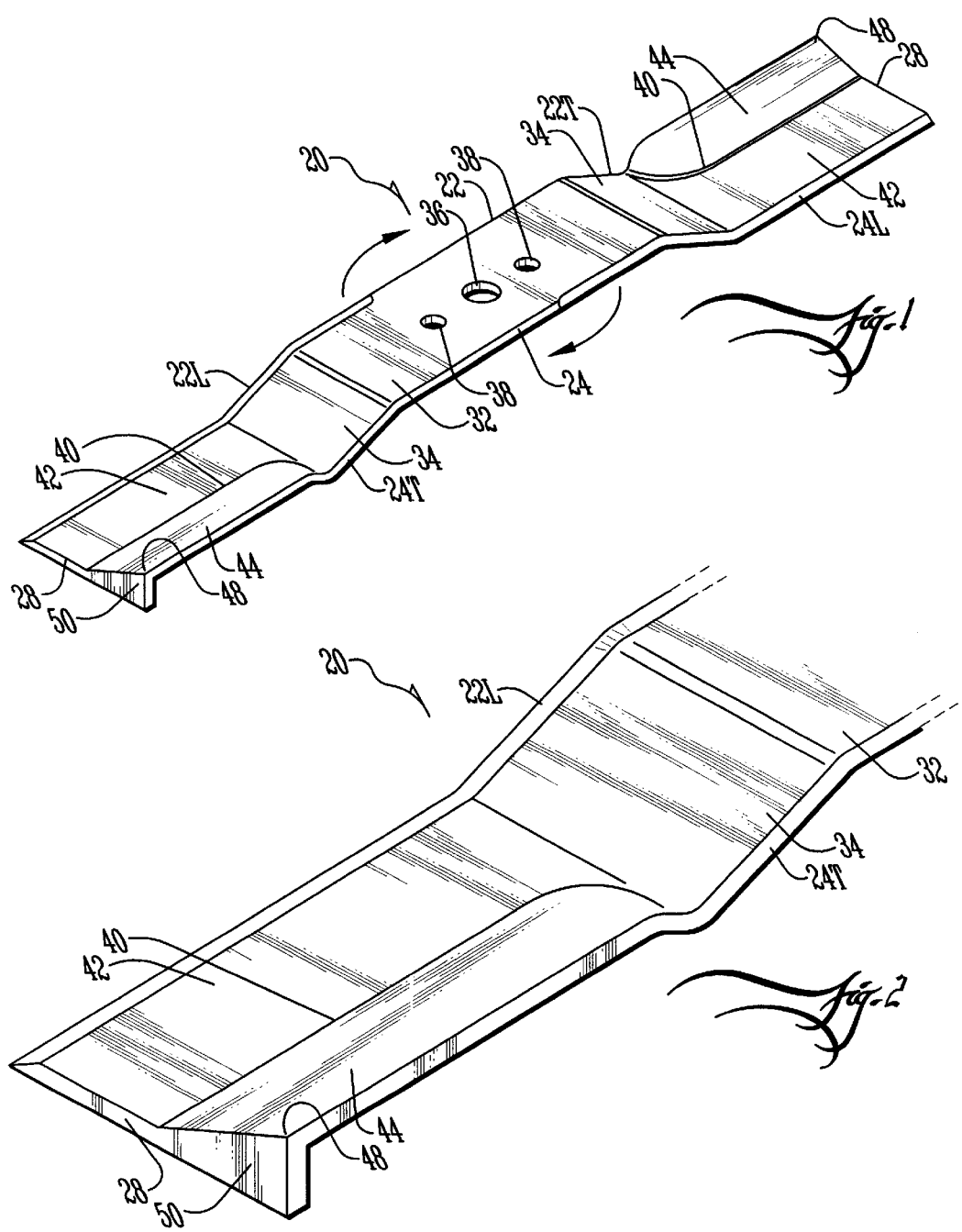

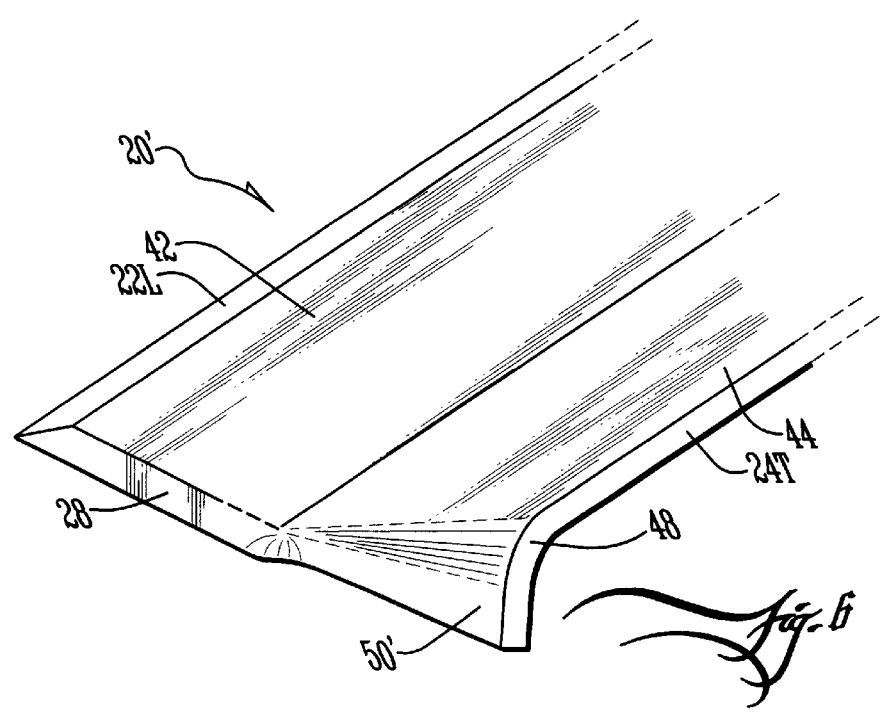
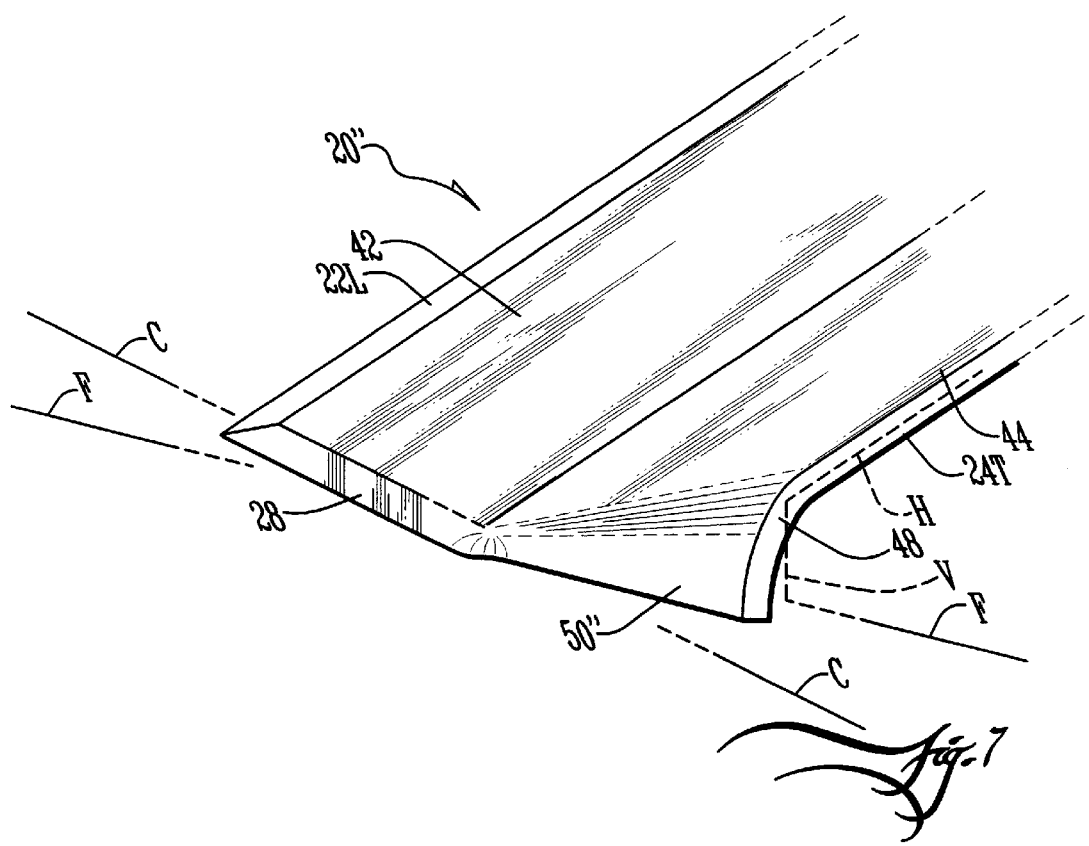

VORTEX REDUCING MOWER BLADE

CROSS-REFERENCE TO PROVISIONAL APPLICATION(S)

This application claims the benefit of U.S. Provisional Application No. 60/098,041, filed Aug. 27, 1999.

BACKGROUND AND SUMMARY OF THE INVENTION

The invention generally relates to a vortex reducing mower blade and, more particularly, to a mower blade arranged in accordance inventive structures for managing and/or reducing the production and/or strength of vortices in the wake of the trailing corners of the blade tips.

It is an object of the invention to provide a rotary mower blade with vortex reducing structures to reduce the production and/or strength of vortices in the wake of the trailing corners of the blade.

It is an alternate object of the invention that the above vortex reducing mower blade reduce the production and/or strength of vortices in the wake of the trailing corners of the blade such that the vortices do not interfere with or decrease the suction (or lift) effect created by the airlifts in the trailing edges of the blade.

It is an additional object of the invention that the foregoing vortex reducing mower blade provide a more even trim of grass rather than an uneven trim seen when vortex production and or strength is too great.

It is a further object of the invention that the foregoing vortex reducing mower blade allow slower speed of operation to get the same suction power as given by a conventional blade not having vortex reducing structures operated at a higher speed.

These and other aspects and objects are provided according to the invention in a vortex reducing mower blade for use with a rotary lawn mower having a motor and a depending drive shaft has a cutting edge on each leading edge thereof, an airlift on each trailing edge thereof, and outboard ends extending between the terminations of the leading and trailing edges. The outboard ends generally meet with the trailing edges at respective trailing corner- or tip-regions. Each outboard end has margins formed as a boundary-layer fence that is angled either upwardly or downwardly relative to a given relative up direction which is parallel to the central axis of the depending drive shaft. These boundary-layer fences reduce the production and/or strength of vortices in the wake of the trailing corner- or tip-regions of the blade. Each boundary-layer fence may be angled either upwardly or downwardly at generally a right angle. To produce a blade this way, generally the blade might be produced from flat steel stock including that each boundary-layer fence is formed as separate weldment from comparable flat steel stock for attaching in position by means of welding. Alternatively, each boundary-layer fence may be angled either upwardly or downwardly in generally a curving sweep. Producing a blade this way can be accomplished by producing the blade as a unit from a single stock piece of flat steel including that the boundary-layer fences are configured therein by means of a brake, stamping or press-forming operation.

Another way of reckoning the vortex reducing mower blade includes the following. It comprises an elongated mower blade extending span-wise between spaced outboard ends. A central mounting portion allows mounting to a depending spindle. There are leading cutting portions proximate the outboard ends of the blade which are formed with respective leading cutting edges for rotating through a common cutting plane. There are also trailing lift portions respectively located behind the leading cutting portions and inclined upwardly from the cutting plane to terminate in trailing edges.

Wherein the location where each pair of trailing edges and outboard ends meet generally happens to define a respective trailing corner- or tip-region. Proximate each outboard end the blade further includes a chord-wise extending boundary-layer fence. Each boundary-layer fence is angled either upwardly or downwardly and as previously mentioned, acts to reduce the production and/or strength of vortices in the wake of the trailing corner- or tip-regions of the blade.

Generally speaking, absent the vortex reducing structures, the mower blade is conventional in at least some of the following respects. It is a rotary mower blade adapted for rotation about an upright axis. It extends span-wise between spaced end portions that terminate in outboard edges. Each end portion extends chord-wise between a leading flat portion sharpened to define a cutting edge and a trailing lift portion joined to and angled upwardly in trailing relationship to the leading flat portion and terminating in a trailing edge. The inventive improvement of said vortex reducing mower blade relates to a boundary-layer fence proximate to or forming a margin of the outboard edge of each lift portion. Each boundary-layer fence is angled either upwardly or downwardly as for reducing the production and/or strength of vortices in the wake of the trailing corner- or tip-regions of the blade.

It is an inventive aspect that each boundary-layer fence may be angled downwardly and given the shape of such a wedge as defined between an upper border common with the respective upwardly-angled lift portion and a lower border defined by an imaginary trailing continuation of the outboard edge of the respective leading flat portion. Each boundary-layer fence may be angled upwardly or downwardly in either a sharp right angle or else a curving sweep. If angled in a curving sweep, then each boundary-layer fence may be angled in the curving sweep such that the termination of which is generally oriented straight up or down as applicable.

Preferably but without excluding any other configuration, the trailing edges extend generally straight and generally parallel to a span-wise-extending plane containing the upright axis. Likewise, preferably but without excluding any other configuration, the outboard edges are generally contained in a chord-wise-extending plane that is parallel to the upright axis such that the trailing corner- or tip-regions are generally right-angled corners.

Optionally the vortex reducing mower blade may further comprise one or more span-wise spaced, chord-wise elongated vortilons distributed across either the upper or lower surfaces of the end portions.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a vortex reducing mower blade in accordance with the invention;

FIG. 2 is an enlarged scale detail from FIG. 1 of one of outboard ends of the mower blade (the other outboard end being a mirror opposite thereof);

FIG. 6 is a perspective view comparable to FIG. 2 except showing an alternate version of the boundary-layer fence configuration on the outboard end of the mower blade, and with portions broken away than in FIG. 2; and, FIG. 7 is a perspective view comparable to FIG. 6 except showing another version of the boundary-layer fence configuration on the outboard end of the mower blade.

DETAILED DESCRIPTION OF THE PREFERRED EMBODIMENTS

Figure 3:
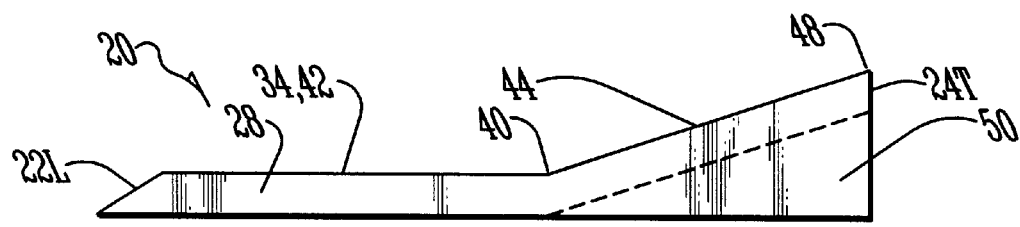
FIG. 3 is an end elevational view of the outboard end of FIGS. 1 or 2.

FIG. 1 is a perspective view of a vortex reducing mower blade 20 in accordance with the invention. The inventive mower blade 20 as it is shown in various example embodiments by the drawings herein, is arranged with alternative structures 50, 60 (eg., FIG. 4) and/or 70 (eg., FIG. 5) and so on, for managing and/or reducing the production and/or strength of trailing vortices, as will be more particularly described below. This provides highly desirable advantages for users of mower blades, as also will be more particularly described below.

The prospective use environment for the inventive mower blade 20 foreseeably includes, to date, the conventional use environments of prior art mower blades (not shown), ranging from without limitation a rather simple walking mower having a single-blade deck, to high-end riding mowers having multi-blade decks (neither shown). The operative use environment can include grass-cutting situations in which typically the mower deck has a chute for discharge of the clippings (and sometimes to an optional grass catcher), as well as include other situations in which the mower deck has no chute or the chute is blocked off as is sometimes desirable for mulching situations (none of this is shown).

The mower blade 20 in accordance with the invention is preferably formed from standard blank stock. Typically, standard blank stock is provided in the form of flat steel having a uniform thickness as well as a uniform width between opposite edges 22 and 24, and which is cut to measure between opposite ends 28. The blank stock is formed during fabrication to give the resultant blade 20 a central portion 32 flanked by opposite formed portions 34. The central portion 32 is formed with the mounting formations for allowing the blade 20 to mount on a depending spindle (eg., drive shaft of the motor thereof) of a given rotary mower. One example mounting arrangement as shown by the drawings has the central portion 32 bored through with an enlarged center hole 36 and a pair of flanking mounting holes 38 for attaching the blade 20 to a spindle-mounting adapter (not shown) as is known in the art. The blade 20 is driven by the powerplant(s) of the particular mower it is mounted to as is also known in the art (and also not shown).

The blade 20 as shown in the drawings is arranged for revolving clockwise. However, the blade 20 is shown this way merely for convenience in the drawings and hence this is not limiting because the blade 20 can be formed in a mirror opposite arrangement as is commonly done to render it suitable for operating in the counterclockwise direction.

Each formed portion 34 extends between a leading edge 22L or 24L and a generally parallel trailing edge 22T or 24T, both which terminate in corners with the respective outboard end 28. The leading edge 22L/24L is ground with a beveled cutting edge, usually at about a 30° angle or so. The formed portions 34 are bent along a fold line 40 that lies between and extends generally parallel with the leading and trailing edges 22L/24L and/or 22T/24T. The bend at the fold line 40 produces in the blade 20 both a flat panel 42 that originates behind the leading edge 22L/24L and a ramp panel 44 that terminates in the trailing edge 22T/24T. This ramp panel 44 is more commonly termed an "airlift."

The airlift 44 (which is sometimes referred to as the "camber") acts as a fan to create a suction or a least reduce or evacuate the air pressure. Suction is useful for straightening bent or reclining grass-blades to a more upright erect position to gain as much of an even trim of the grass-blades as possible (not illustrated). Suction is also useful for swirling around the clippings for mulching purposes and/or for discharging the clippings out an appropriate chute for them.

In FIG. 2, the corner 48 between each trailing edge 22T or 24T and the respective outboard end 28 forms what is termed here the "trailing tip."

A shortcoming with prior art mower blades involves vortex production in the wake of such trailing tips 48 of the airlifts 44. In general, a vortex is a swirling current created by differences in air pressure and velocity between the high pressure (low velocity) region above the airlift 44 and the low pressure (high velocity) region below. Physically, this corresponds to high pressure airflow from above the airlift 44 rolling down around the outboard end 28 to join the low pressure airflow below the airlift 44, causing a downwardly and inwardly swirling vortex shedding off the trailing tip (these flows and/or currents are not illustrated).

Strong vortices are problematic because they swirl the grass-blades around in spiral reclining positions or even blow them down flat by virtue of strong down eddies. Grass-blades being swirled around or blown flat is counterproductive to the useful work of the airlift 44:—ie., in suctioning up the grass-blades into an upright erect position.

Vortices are detrimental to the overall trim of the grass because the trim height is correspondingly undesirably uneven. The problem of the vortices is aggravated by speeding up any of the prior art mower blades (but this condition is not as strictly applicable to the inventive blade 20, as will be described more particularly below). Whereas a higher speed does induce a greater suctioning force, it correspondingly produces stronger vortices from the prior art blades such that the gains in suctioning force are not just offset but worsened by such stronger vortices.

Moreover, the problem of vortices is compounded in mowers having multi-blade decks. Where the swaths of two blades overlap, they create interfering vortices. The sum of the detrimental effects left by the trail of the interfering vortices is greater than the vortex trail left by one blade alone. Users of multi-blade mowers—especially with counter-rotating blades—are familiar with stripes of long grass they leave behind that corresponds to where the swaths of adjacent blades overlap.

What is needed is an improvement in prior art mower blades to provide management and/or reduction in the production of and/or strength of such vortices. Therefore these and other aspects and objects are provided according to the invention in a mower blade 20 in accordance with the invention, of which one version of vortex management and/or reduction for mower blades is shown by FIGS. 1 through 3.

The outboard ends 28 are provided with an inventive, wedge-shaped boundary-layer fence 50. As best shown by FIG. 3, the wedge-shaped boundary-layer fence 50 fills the wedge-shaped space defined by the bent-up airlift panel 44 and an imaginary continuation of the flat panel 42. With the fence 50 arranged as shown, a portion of the high pressure flow from above the airlift 44 rolls around the fence 50 and deflects the low pressure flow below the airlift 44 in opposition to the normal rotation of a shedding vortex, and thereby weakens the resultant vortex. The physical phenomenon of this flow interaction is more fully given by reference literature elsewhere, including without limitation, what is disclosed by U.S. Pat. No. 4,108,43—Finch, the disclosure of which is incorporated herein by this reference to it.

Trials with the fence arrangement 50 depicted by FIGS. 1 through 3, have shown that weakening the vortices provides numerous advantages. Apparently, the vortices are weakened such that they depress much less grass in counteraction to the suction of the airlift 44. Hence the apparent "lift" of the grass is better. Perhaps there is less "loss" to what is physically available for lift and so there is an apparent "gain" in the lift or suction of the grass. Regardless, observed improvements and advantages gained by the inventive mower blade 20 provided with the boundary-layer fence 50 as shown, include without limitation a few of the following.

By one easy measure, a user gains—as plainly evident by even merely casual observation—a much more cleaner cut for the grass. Simply put, the trim height is plainly more even.

Also, the inventive blade 20 works better on wet grass. In wet grass, individual grass-blades are already partially depressed by the weight of the wetness, and that also makes them heavier to lift and in some cases they are stuck together in clumps. Gains in lift or suctioning mean that the inventive mower blade 20 handles wet grass better than its prior art counterparts.

For another thing, the speed of the blade 20 can be slowed for safer operation. That is, the inventive blade 20 provides as much or comparable lift as its prior art counterparts when revolved at relatively slower speeds.

Still further, speeding up the revolving of the blade 20 provides gains in lift or suctioning whereas in prior art blades, speeding them up only creates a worsened situation with vortices.

Additionally, gains in lift allow a user to let the height of the blade 20 remain relatively higher for suctioning up heavy matter such as leaves of the like. By way of background, a user of a prior art blade might drop his or her normal blade height for grass (perhaps corresponding to 3½ or 4 inches or so, or 9–10 cm), down by about half (eg., to about 2 inches or 5 cm) for suctioning up leaves in a mulching operation. Whereas a lowering a blade does provide gains in lift, a lower blade is more generally undesirable because it exposes the blade to more risk of damage on rocks or tree-root knees and the like.

In accordance with the invention, gains in lift provided by the inventive blade 20 allow a user to keep the blade height at his or her normal height even for leaf-mulching operations and the like.

Figure 4:
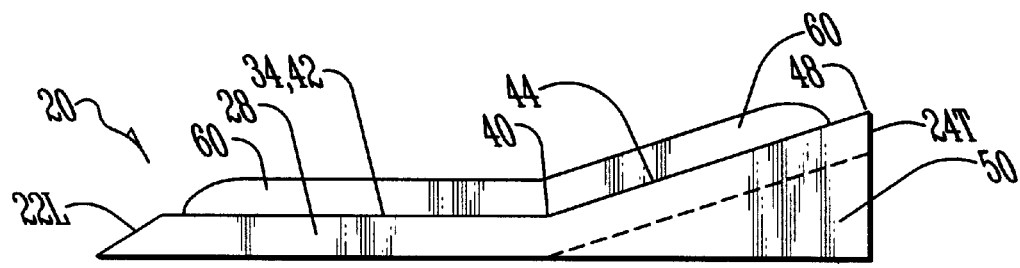
FIG. 4 is an end elevational view comparable to FIG. 3 except showing the further provision of an upper boundary layer fence.
Figure 5:
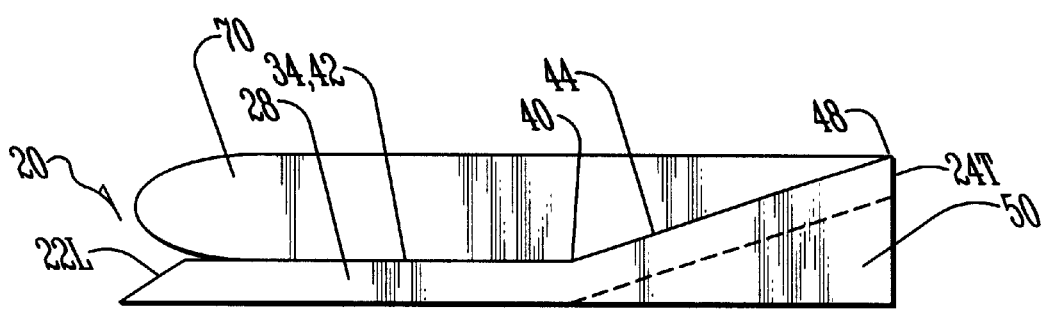
FIG. 5 is an end elevational view likewise comparable to FIG. 3 except showing the further provision of a vortilon.

FIGS. 4 and 5 show alternative examples 60 and/or 70 for the management and/or reduction in the production and/or strength of vortices in mower blades, whether used in combination or not with the wedge-shaped fence 50.

FIG. 4 shows a low, boundary-layer fence 60 established on the upper surface of the blade 20, extending substantially across the width of both the flat panel 42 and the airlift panel 44. This upper fence 60 as shown is located flush along the outboard edge 28. However, it might be preferred to deploy a set of such an upper fence 60 as distributed along the span of the leading edges 22L or 24 L from a given inboard extreme (not shown) to an outboard terminus at the very outboard edge 28 (again, this is not shown). This upper fence 60 is believed to act to contain some fractional amount of the high pressure flow that potentially would roll around the outboard end 28 of the blade 20, and in consequence act to reduce vortex production and strength. In FIG. 4, the upper fence 60 is intentionally low with respect to the bevel of the cutting edge 22L. That way, the upper fence 60 does not interfere with grinding of the bevel 22L in re-sharpening operations for a dull blade 20.

FIG. 5 shows a special case of a boundary-layer fence 70, known as a "vortilon." Vortilons on aircraft typically have noses that jut ahead of the leading edge of the wing they are mounted on (no "wing" is shown by the drawings), as well as typically are established on the high pressure side of an aircraft wing. Hence, on aircraft wings, vortilons are typically suspended beneath the wing but here, the vortilon 70 is positioned on the upper surface of the blade 20 at the outboard end 28. Also, a vortilon 70 such as this one is typically used in a set, the members of which are distributed along the span of the respective airlift 44 or aircraft wing to which they are attached (eg., as commonly seen on Long EZ aircraft which were originally designed by the Rutan brothers, Burt and Dick). Likewise it is preferred if this vortilon structure 70 here is used in a set that is distributed across the span of the leading edge 22L or 24L at spaced inboard-to-outboard locations (not shown).

Referring back to FIG. 2, one way of configuring the mower blade 20 with the vortex-reducing fence 50 is the following. The fence 50 is pre-cut from a separate stock of flat steel material that is comparable to the flat steep material forming the main body of the mower blade 20 (this is not shown). The pre-cut piece that will become the fence 50 is cut generally in the shape of a wedge. The shape of this wedge is described above. Briefly, that is, as best shown by FIG. 3, the shape of the wedge corresponds to the wedge-shaped space defined by the bent-up airlift panel 44 and an imaginary continuation of the flat panel 42. Given that shape, the pre-cut wedge is then fitted in the above-described space for it and welded in place. Grinding off excess weld material blends the contours of the mower blade 20 and fence 50 to give the results which are best shown by FIG. 2.

FIG. 6 shows an alternate version of the FIG. 2 style vortex-reducing fence 50, wherein FIG. 6 shows a fence 50' which is produced by a stamping operation. More particularly, that is, the FIG. 6 fence 50' is formed as a unit from the same stock piece that constitutes the main body of the mower blade 20'. In other words, during a single braking or stamping operation, the mower blade 20' is formed from a flat stock piece into the formed mower blade 20' all at once. This includes not only the formed portion 34 and airlift 44' but also the fence 50' as well. Comparing FIGS. 2 and 6 shows that the FIG. 6 fence 50' has rounded fold lines whereas the FIG. 2 fence 50 defines a sharp right-angle crease that is the product of welding and grinding.

FIG. 7 shows another version of the FIG. 6 style vortex-reducing fence 50'. wherein FIG. 7 shows a fence 50"

likewise produced by a stamping operation. Comparing FIGS. 6 and 7 shows that the FIG. 7 fence 50" is folded on an angle that is coming back inboard slightly rather than as in FIG. 6, being fairly close to parallel with a chord-wise axis. This is explained better by more difficult language as follows. The outboard edge 28 of the leading flat portion 42 generally extends along an axis C. This axis C extends in the chord-wise direction relative to the span of the blade 20". To understand these relative axes, it is easiest to reckon the blade 20" as mounted to an upright spindle of a rotary mower such that the spindle on flat ground is more or less vertical and the plane which the cutting edges 22L sweep through is generally horizontal.

Given the configuration of this blade 20", its trailing edge 24T generally extends along an axis which is parallel to a span-wise axis or spoke extending through the spindle (not shown) and which is horizontal. Again, the trailing edge 24T extends along a horizontal axis indicated by reference letter H that is parallel to a span-wise axis or plane (not indicated) containing the vertical spindle the blade 20" mounts to. That portion of the outboard edge 28 that extends along the leading flat portion 42, extends along a true, horizontal chord-wise axis C. The trailing corner 48 of this blade is defined by where the trailing edge 24T meets the boundary layer fence 50". If a vertical axis V is dropped from this corner 48 to the horizontal plane containing horizontal chord-wise axis C, and then the axis F is drawn in, it being the projection in this horizontal plane of the fold line for downwardly-angled fence 50". Therefore, axis F is the projection down of the fold line angle of boundary-layer fence 50" in the horizontal plane that not only contains horizontal chord-wise axis C but also the leading flat portion 42.

Given the foregoing, FIG. 7 shows that the boundary layer fence can be bent down from the web of the airlift 44 but at slightly cocked angle not true to the vertical plane containing the outboard edge 28. The drawing shows this slightly cocked angle being the divergence between axes C and F which are commonly contained in a horizontal plane containing leading flat span 42. It is preferred that the FIG. 7 version of the invention be limited to cases where the boundary-fence 50" is angled downwardly and not upwardly relative to the web of the airlift 44. This is especially more preferred in cases where the divergence between axes C and F becomes progressively larger.

The purpose behind the FIGS. 6 and 7 embodiments is particularly for accommodating blades stamped from thick gauge plate, a thickness being in mind of ¼-inch (6 mm) or so (and not excluding thicker or thinner materials). The common steel that blades are presently made of (and known to the inventor) start not to bend easily along sharp fold lines for right angles when the material gets about ¼-inch (6 mm). Materials of other alloys experience bending this way with difficulty at greater or lesser thicknesses, but this is not exactly known. In fact, FIG. 7 shows an inventive way of accommodates the truly least pliant of materials for adaptation in accordance with the invention.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:
1. A vortex reducing mower blade comprising:
a rotary mower blade adapted for rotation about an upright axis and extending span-wise between spaced end portions that terminate in outboard edges, each end portion comprising a leading flat panel originating from a leading edge sharpened to define a cutting edge and a chord-wise trailing lift and joined to and angled upwardly in trailing relationship to the leading flat panel and terminating in a trailing edge, wherein said trailing lift panel has a span-wise extension that generally at least matches the leading flat panel's span-wise extension in order to provide an applied suction across a span of grass blades that come under the flat panel's cutting edge and thereby promote upward straightening of the grass blades and hence a more even trim height, and wherein each pair of trailing edges and outboard edges generally meet at a respective vortex-shedding trailing tip region; and,
a boundary-layer fence forming a margin of the outboard edge of each lift panel, each boundary-layer fence angled either upwardly or downwardly for reducing the production and/or strength of vortices in the wake of the trailing tip regions of the blade whereby the boundary-layer fences weaken such detrimental effects of vortices as swirling and downward blowing on the grass blades that come under the trailing tips which if not weakened would overcome much of the upward straightness promoted by the applied suction and then wreck the evenness of the trim.

2. The vortex reducing mower blade of claim 1 wherein each boundary-layer fence is angled downwardly and has the shape of a wedge defined between an upper border common with the respective upwardly-angled lift pane1 and a lower border defined by an imaginary trailing continuation of the outboard edge of the respective leading flat panel.

3. The vortex reducing mower blade of claim 2 wherein each boundary-layer fence is angled downwardly at generally a right angle.

4. The vortex reducing mower blade of claim 2 wherein each boundary-layer fence is angled downwardly in a curving sweep.

5. The vortex reducing mower blade of claim 4 wherein each boundary-layer fence is angled downwardly in the curving sweep such that the termination of which is generally oriented straight down.

6. The vortex reducing mower blade of claim 1 wherein the trailing edges extend generally straight and generally parallel to a span-wise-extending plane containing the upright axis.

7. The vortex reducing mower blade of claim 6 wherein the outboard edges are generally contained in a chord-wise-extending plane that is parallel to the upright axis, whereby the trailing tip regions are generally right-angled corners.

8. The vortex reducing mower blade of claim 1 further comprising one or more span-wise spaced, chord-wise elongated vortilons distributed across either the upper or lower surfaces of the end panels inboard from the outboard edges.

9. A vortex reducing mower blade comprising:
an elongated mower blade extending span-wise between spaced outboard ends and having a central mounting portion for mounting to a depending spindle; the mower blade further having leading cutting panels proximate the outboard ends thereof and formed with respective leading cutting edges for rotating through a common cutting plane, as well as having trailing lift panels respectively located behind the leading cutting panels and inclined upwardly from the cutting plane to terminate in trailing edges, wherein said trailing lift panels have a span-wise extension at least generally co-extensive with the leading cutting panel's span-wise extension in order to provide operatively cooperative suction across a span of grass blades that come under the cutting panel's cutting edge and thereby promote upward straightening of the grass blades and hence a more even trim height, and wherein each pair of trailing edges and outboard edges generally meet at a respective vortex-shedding trailing tip region;

wherein proximate each outboard end the blade further includes a chord-wise extending boundary-layer fence which is angled either upwardly or downwardly for reducing the production and/or strength of vortices in the wake of the trailing tip regions of the blade whereby the boundary-layer fences weaken such detrimental effects of vortices as swirling and downward blowing on the grass blades that come under the trailing tips which if not weakened would overcome much of the upward straightness promoted by the applied suction and then wreck the evenness of the trim.

10. The vortex reducing mower blade of claim 9 wherein each boundary-layer fence is angled either upwardly or downwardly at generally a right angle.

11. The vortex reducing mower blade of claim 10 wherein said blade is produced from flat steel stock including that each boundary-layer fence is formed as separate weldment from comparable flat steel stock for attaching in position by means of welding.

12. The vortex reducing mower blade of claim 9 wherein each boundary-layer fence is angled either upwardly or downwardly in generally a curving sweep.

13. The vortex reducing mower blade of claim 12 wherein said blade is produced as a unit from a single stock piece of flat steel including that the boundary-layer fences are configured therein by means of a brake, stamping or press-forming operation.

14. The vortex reducing mower blade of claim 9 wherein the trailing edges extend generally straight and generally parallel to a span-wise-extending plane containing the spindle axis.

15. The vortex reducing mower blade of claim 14 wherein the outboard ends are generally contained in a chord-wise-extending plane that is parallel to the spindle axis, whereby the trailing tip regions are generally right-angled corners.

16. A vortex reducing mower blade for use with a rotary lawn mower having a motor and a depending drive shaft, comprising:

a level cutting edge on each leading edge thereof and extending between span-wise extremes, an airlift on each trailing edge thereof, wherein said airlift has a span-wise extension is at least generally co-extensive with the span-wise extent of the level cutting edge between said span-wise extremes thereof said airlift accordingly providing an operatively cooperative suction across a span of grass blades that come under the level cutting edge and thereby promote upward straightening of the grass blades and hence a more even trim height, and outboard ends extending between the terminations of the leading and trailing edges, which outboard ends meet with the trailing edges generally meet at a respective vortex-shedding trailing tip region, wherein each outboard end has margins formed as a boundary-layer fence that is angled either upwardly or downwardly relative to a given relative up direction which is parallel to the central axis of the depending drive shaft, whereby said boundary-layer fences reduce the production and/or strength of vortices in the wake of the trailing tip regions of the blade and thereby weaken such detrimental effects of vortices as swirling and downward blowing on the grass blades that come under the trailing tips which if not weakened would overcome much of the upward straightness promoted by the applied suction and then wreck the evenness of the trim.

17. The vortex reducing mower blade of claim 16 wherein each boundary-layer fence is angled either upwardly or downwardly at generally a right angle.

18. The vortex reducing mower blade of claim 17 wherein said blade is produced from flat steel stock including that each boundary-layer fence is formed as separate weldment from comparable flat steel stock for attaching in position by means of welding.

19. The vortex reducing mower blade of claim 16 wherein each boundary-layer fence is angled either upwardly or downwardly in generally a curving sweep.

20. The vortex reducing mower blade of claim 19 wherein said blade is produced as a unit from a single stock piece of flat steel including that the boundary-layer fences are configured therein by means of a brake, stamping or press-forming operation.

* * * * *